(12) United States Patent
Bentkofsky et al.

(10) Patent No.: US 8,838,531 B2
(45) Date of Patent: Sep. 16, 2014

(54) DATABASE SYNCHRONIZATION AND VALIDATION

(71) Applicants: Michael Bentkofsky, Falls Church, VA (US); Patrick Quaid, San Jose, CA (US); Bradley McMillen, San Francisco, CA (US)

(72) Inventors: Michael Bentkofsky, Falls Church, VA (US); Patrick Quaid, San Jose, CA (US); Bradley McMillen, San Francisco, CA (US)

(73) Assignee: Verisign, Inc., Reston, VA (US)

( * ) Notice: Subject to any disclaimer, the term of this patent is extended or adjusted under 35 U.S.C. 154(b) by 55 days.

(21) Appl. No.: 13/675,908

(22) Filed: Nov. 13, 2012

(65) Prior Publication Data

US 2013/0073524 A1  Mar. 21, 2013

Related U.S. Application Data

(63) Continuation of application No. 12/906,618, filed on Oct. 18, 2010, now Pat. No. 8,332,433.

(51) Int. Cl.
G06F 17/30 (2006.01)
(52) U.S. Cl.
CPC .................. G06F 17/30371 (2013.01)
USPC ........... 707/610; 707/640; 707/688; 707/697; 707/703; 707/828
(58) Field of Classification Search
CPC ....................................................... G06F 17/30
USPC ................................................ 707/600–899
See application file for complete search history.

(56) References Cited

U.S. PATENT DOCUMENTS

| | | |
|---|---|---|
| 6,338,082 B1 | 1/2002 | Schneider |
| 6,493,725 B1 | 12/2002 | Iwai et al. |
| 6,643,669 B1 | 11/2003 | Novak et al. |
| 6,678,717 B1 | 1/2004 | Schneider |
| 6,681,228 B2 | 1/2004 | Balogh |
| 6,779,127 B1 | 8/2004 | Lee |
| 7,047,258 B2 | 5/2006 | Balogh et al. |
| 7,136,932 B1 | 11/2006 | Schneider |
| 7,167,877 B2 | 1/2007 | Balogh et al. |
| 7,203,682 B2 | 4/2007 | Balogh |
| 7,565,402 B2 | 7/2009 | Schneider |
| 7,890,961 B2 * | 2/2011 | Whittle et al. ................ 719/320 |
| 8,037,168 B2 | 10/2011 | Schneider |
| 8,224,994 B1 | 7/2012 | Schneider |
| RE43,690 E | 9/2012 | Schneider et al. |
| RE44,207 E | 5/2013 | Schneider |

(Continued)

FOREIGN PATENT DOCUMENTS

| | | |
|---|---|---|
| JP | 7028002 | 1/1995 |
| WO | 9735269 | 9/1997 |

*Primary Examiner* — Isaac M Woo
(74) *Attorney, Agent, or Firm* — MH2 Technology Law Group, LLP

(57) ABSTRACT

Systems and methods for verifying data in a distributed database using different automated check operations at different times during the database read and update cycles. Various functions may be performed including executing a first check during update operations of the database. A second check may also be executed during the update operation of the database, and be implemented as an execution thread of an update daemon. A third check may be executed at a time interval between update functions of the update daemon. A fourth check may be executed during a time that the database is not being updated. Integrity of data in the database may be verified by a computer processor based on the first, second, third, and fourth checks.

20 Claims, 12 Drawing Sheets

(56) References Cited

U.S. PATENT DOCUMENTS

2002/0059187 A1  5/2002 Delo et al.
2004/0267837 A1* 12/2004 Wang et al. .................. 707/203
2008/0016233 A1  1/2008 Schneider
2009/0187879 A1  7/2009 Ao et al.
2012/0095974 A1  4/2012 Bentkofsky

* cited by examiner

| Name | Type | Detail |
|---|---|---|
| dbTableType | ENUM | An enumerated table identifier. |
| name | const char * | The descriptive name of the table. |
| alias | const char * | A short name of the table. |
| description | const char * | A description of the table. |
| oidFlag | boolean | Whether the table can be referenced as an OID. |
| numIndices | UINT32 | Count of indexes for the table. |
| indexInfo | Array of indexInfo | An array of index definitions (see below). |
| recordfn | Function pointer | A pointer to a function that is called as records are added to the table. |

FIG. 6

| Name | Type | Detail |
|---|---|---|
| dbIndexType | ENUM | An enumerated index type identifier (currently only Hash is supported) |
| initialSize | UINT32 | Size of the hash table |
| growthFactor | UINT32 | Unused. |
| numKeyTypes | UINT32 | Number of key fields in the index. |
| dbRecordType | Array of keyType | An array of enumerated fields that comprise the key. |

FIG. 7

| Name | Type | Detail |
|---|---|---|
| id | ENUM | An enumerated field identifier (same enumeration as the indexinfo.dbRecordType) |
| name | const char * | The descriptive name of the field. |
| alias | const char * | A short name of the field. |
| description | const char * | A description of the field. |
| dbValueType | ENUM | An enumeration of the field value type (e.g. CHAR, INT32, etc.) |
| minimum | UINT32 | A minimum count required to be present in the database row (e.g. a value of 1 indicates the field is not nullable). |
| maximum | UINT32 | A maximum count which can be present. |
| length | UINT32 | A maximum size for CHAR, VARCHAR field types. |
| keyTable | ENUM | The enumeration to the table if this is a foreign key field. |
| convertType | ENUM | A standard importation conversion function. |
| attrfn | Function pointer | A field validation function pointer. |

FIG. 8

DATABASE SYNCHRONIZATION AND VALIDATION

This application claims the benefit and is a continuation of U.S. patent application Ser. No. 12/906,618, filed Oct. 18, 2010, which is incorporated herein by reference in its entirety.

BACKGROUND OF THE INVENTION

Distributed databases are a significant feature of many modern network applications, including DNS resolution, user validation, financial support, and myriad business activities. Details of exemplary database structures, including update operations, that may be suited for validation according to the subject matter discussed herein may be found, for example, in U.S. Pat. No. 6,681,228, Jan. 20, 2004, U.S. Pat. No. 7,047,258, May 16, 2006, U.S. Pat. No. 7,167,877, Jan. 23, 2007, and U.S. Pat. No. 7,203,682, Apr. 10, 2007, the contents of which are incorporated herein by reference in their entireties.

One issue common to distributed database applications is the need for data integrity among the various copies of the database, particularly in light of updates, and the like, that cause changes to the data. This issue often involves a balance of many factors, including the nature and volume of the data, the number and function of copies of the database, and rates of change and access to the data.

Data scrubbing, also known as data cleansing, is the process of identifying, amending and/or removing data in a database that is incorrect, incomplete, improperly formatted, or duplicated. Scrubbing can also be used proactively to help identify when software or other problems may be contributing to errors in the database, such as a distributed database with replication problems, etc. Organizations in data-intensive fields, such as online services, banking, insurance, retailing, telecommunications, etc., may use data scrubbing tools to examine data in one or more databases for flaws by using rules, algorithms, and look-up tables. Using automated data scrubbing tools has become increasingly necessary as the size and complexity of databases has expanded beyond the realm where manual analysis, review and correction by database administrators is impracticable.

Without timely and accurate data cleansing, various problems can ensue including, for example, merging corrupt or incomplete data from multiple databases in distributed database structures, providing inaccurate data to requesting users, etc. This is particularly acute in systems where improperly functioning or corrupted software, or other operational factors, can multiply an error over thousands or millions of pieces of erroneous, duplicated or inconsistent data. Additionally, many applications have particular concerns with respect to integrity, performance, and recovery of data in the database. For example, in systems that are relied on to provide critical support services for the Internet, concerns such as the reliable availability of the service, the ability to improve access through geographic distribution of operational components, and data backup and recovery are all critical. As for throughput and availability, in the context of DNS resolution, sites for one registry may answer over thirty four billion queries a day. Therefore, it is important to maintain a thorough and timely assessment of the data in a database, particularly when large-scale databases including distributed replication, or data warehouses that merge information from many different sources, are being used in high-accessibility, high-volume applications such as DNS resolution and the like. However, based on parameters such as the size of the database, the required accessibility to the database, and the like, it can be more difficult to maintain a thorough and up to date assessment on the data in a database without, for example, taking certain copies of the database offline, applying read/write locks, etc. and other measures that detract from the overall efficiency of the database.

SUMMARY OF THE INVENTION

The present subject matter addresses aspects of the challenges discussed above by providing systems and methods that may be beneficial in the timely and accurate discovery of data errors in databases, such as distributed database, and may further help to identify software errors and the like manifesting in shared memory database, before such errors would be discovered through routine scrubbing techniques currently known in the art. Disclosed systems and methods may be used, for example, to validate structures within a database for internal consistency, and may be accomplished outside of the routine database processing. In embodiments, the combined tools may identify inconsistencies suggestive of software errors (e.g. "bugs") introduced through normal procedures, such as new software updates, as well as malicious code.

According to aspects of the invention, methods for verifying data in a distributed database may include executing one or more checks by a computer processor, such as, a first check during an update operation of the database; a second check during the update operation of the database; a third check at a time interval between update functions of an update daemon; and/or a fourth check during a time that the database is not being updated. In embodiments, the second check may be implemented as an execution thread of an update daemon of the update operation. Embodiments may also include verifying integrity of data in the database by a computer processor based one or more of the first, second, third, and/or fourth checks.

In embodiments, the first check may include a page read verification based on a master block including information regarding all of other memory blocks in a shared memory database. A second check may include at least one of an index structural validation and a row content validation. A third check may include a transaction log verification based on a portion of a transaction log of previous actions related to the database. The transaction log verification may identify at least one of a semantic correctness of the transaction log, a database memory allocation, and validity of memory block addresses related to operations of the transaction log.

In embodiments, a fourth check may include a database memory accounting including identifying any multiple uses of a single memory element. A fourth check may include a foreign key verification including at least one of identifying any child records that refer to an invalid parent address, and identifying a discrepancy in a number of child records referring to a valid parent record. According to embodiments the fourth check may be executed immediately prior to loading a replica database with a copy of the master database, such as before initiating an initial send file to the database.

According to embodiments, the distributed database may be DNS top level domain server, and the first, second, third, and fourth checks may validate all data structures within the distributed database at least once every 6 hours, and/or validate all data in the database at least once every 24 hours.

According to other aspects of the invention, systems for verifying data in a distributed database may include a microprocessor and a computer-readable storage medium including instructions for configuring the processor to perform functions including: executing one or more checks including a first check during an update operation of the database; a second check during the update operation of the database, the second check implemented as an execution thread of an update daemon of the update operation; a third check at a time interval between update functions of the update daemon; and/or a fourth check during a time that the database is not being updated. The instructions may further include code for verifying integrity of data in the database by a computer processor based on the first, second, third, and/or fourth checks.

In embodiments, a first check may include a page read verification based on a master block including information regarding all of other memory blocks in a shared memory database. In further embodiments, a second check may include at least one of an index structural validation and a row content validation. A third check may include a transaction log verification based on a portion of a transaction log of previous actions related to the database, the transaction log verification identifying at least one of a semantic correctness of the transaction log, a database memory allocation, and validity of memory block addresses related to operations of the transaction log.

According to embodiments, a fourth check may include a database memory accounting including identifying any multiple uses of a single memory element, and/or a foreign key verification including at least one of identifying any child records that refer to an invalid parent address, and identifying a discrepancy in a number of child records referring to a valid parent record.

According to embodiments, the distributed database may be a DNS top level domain server, and the first, second, third, and/or fourth checks may validate all data structures within the distributed database at least once every 6 hours, and/or validate all data in the database at least once every 24 hours.

In embodiments where the distributed database is a DNS top level domain server, a fourth check may be executed immediately prior to loading a replica database with a copy of the master database, e.g. initiating an initial send file to the database.

According to other aspects of the invention, a non-transitory computer-readable storage medium may be provided including instructions for configuring a microprocessor to perform functions for verifying data in a distributed database, including: executing one or more checks including a first check during an update operation of the database; a second check during the update operation of the database, the second check implemented as an execution thread of an update daemon of the update operation; a third check at a time interval between update functions of the update daemon; and/or a fourth check during a time that the database is not being updated. Embodiments may include further instructions with code for verifying integrity of data in the database by a computer processor based on the first, second, third, and/or fourth checks.

In embodiments, a first check may include a page read verification based on a master block including information regarding all of other memory blocks in a shared memory database. In further embodiments, a second check may include at least one of an index structural validation and a row content validation.

In embodiments, a third check may include a transaction log verification based on a portion of a transaction log of previous actions related to the database, the transaction log verification identifying at least one of a semantic correctness of the transaction log, a database memory allocation, and validity of memory block addresses related to operations of the transaction log.

In embodiments, a fourth check may include a database memory accounting including identifying any multiple uses of a single memory element, and/or a foreign key verification including at least one of identifying any child records that refer to an invalid parent address, and identifying a discrepancy in a number of child records referring to a valid parent record.

In embodiments, the distributed database may be a DNS top level domain server, and the first, second, third, and/or fourth checks validate all data structures within the distributed database at least once every 6 hours, and/or validate all data in the database at least once every 24 hours.

In embodiments where the distributed database is DNS top level domain server, a fourth check may be executed immediately prior to loading a replica database with a copy of the master database, e.g. initiating an initial send file to the database.

Further advantages of the present subject matter will become apparent to those of ordinary skill in the art upon reading and understanding the following detailed description of the preferred embodiments.

BRIEF DESCRIPTION OF THE DRAWINGS

FIG. 6 depicts aspects of an exemplary database table structure array in accordance with an embodiment of the present invention;

FIG. 7 depicts aspects of an exemplary index array in accordance with an embodiment of the present invention;

FIG. 8 depicts aspects of an exemplary record table array in accordance with an embodiment of the present invention;

DETAILED DESCRIPTION OF THE INVENTION

The following detailed description is provided with reference to exemplary embodiments for the ease of description and understanding. Applicants' invention is not limited to the disclosed embodiments, and encompasses other variations that fall within the overall scope of description provided herein.

DEFINITIONS

Checkpoint. A binary snapshot of the database, typically made once per day.

HUD. Heads-Up Display, an application that displays the real-time status of database components.

ISF. Initial SendFile. A complete textual snapshot of a database.

LUE. Lookup Engine, A machine that houses an in-memory database replica that is responsible for performing database queries.

OID. Object Identifier. A unique identifier of a record across all tables in a database that can be referenced by another recording implementing a foreign key relationship.

Resolution Site. A physical location, normally including a set of application servers and replicated databases (LUE's).

SF. SendFile. A file containing a set of one or more database updates described as transactional record creation, modification, or deletion.

SPP. SuperPacket Protocol. A particular communication protocol used between database PE's and LUE's for variously combining database requests, responses and updates.

SuperPacket. A set of queries, responses or updates packaged together in a single packet.

Update Daemon. A database component responsible for updating an existing in-memory database on a LUE, through sendfiles.

Figure 1:
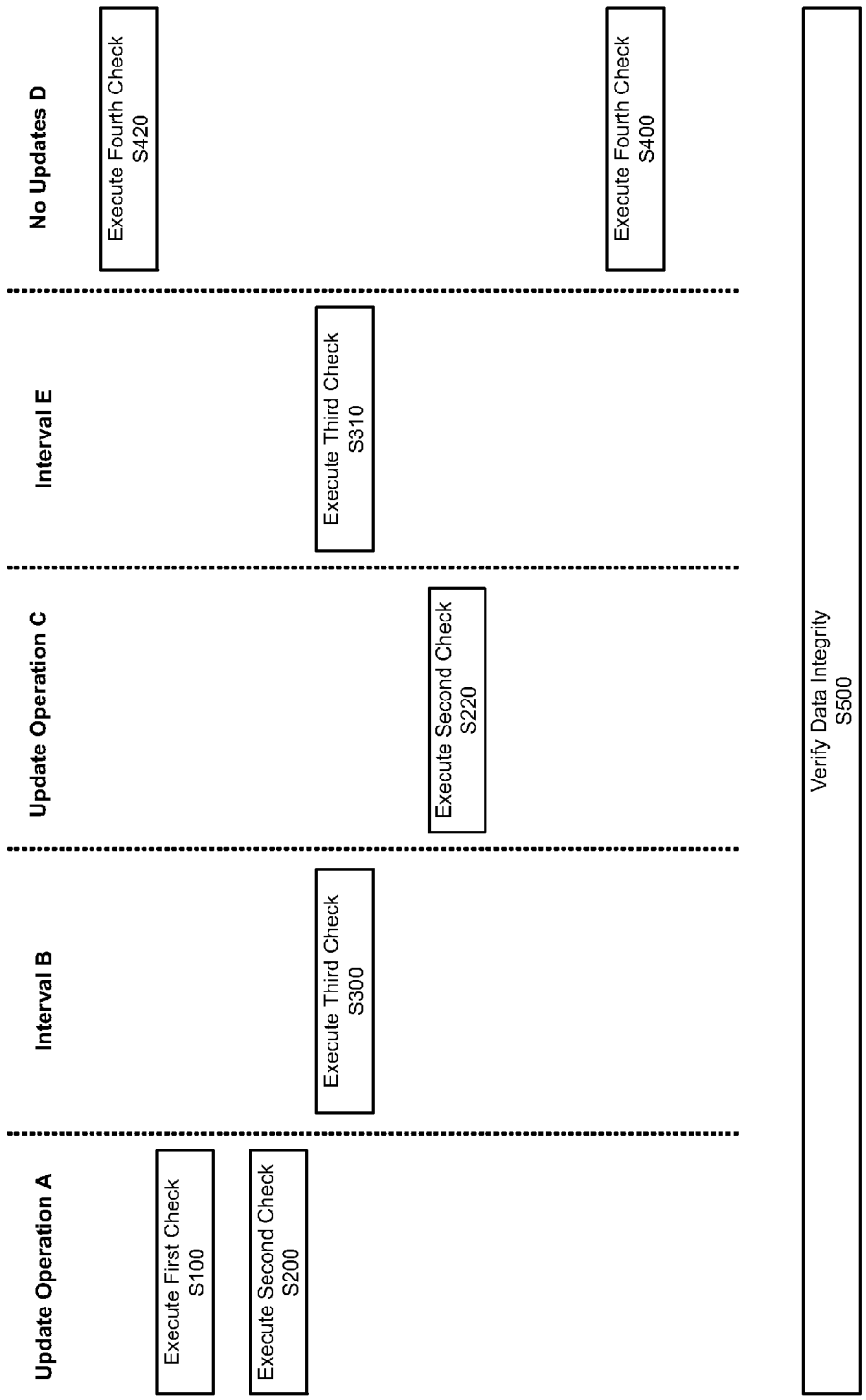
FIG. 1 depicts aspects of an exemplary method in accordance with an embodiment of the present invention.

FIG. 1 depicts aspects of a high-level representation of checks according to an exemplary embodiments of the invention. As shown in FIG. 1, methods for verifying data in a distributed database may include executing one or more checks by a computer processor at different times with respect to other database functions, such as update operations. As discussed herein, an "update" may include one or more specific update operations, tasks or functions, that may operate on different database components. This may be accomplished in various ways, such as, for example, including multiple update instructions in a sendfile, performing an update operation including writing a new element and deleting an old element or pointer to the old element, applying a similar update to various database records, etc.

As shown in FIG. 1, a first check may be executed in S100 during an update operation A of the database. A second check may also be executed in S200 during the update operation A. The second check in S200 may be implemented as an execution thread of an update daemon of the update operation A. It should also be understood that, although described in the context of "first", "second", "third" and "fourth" checks, the identifiers of these checks does not imply any necessary sequence to the checks apart from those specifically described herein. That is, any of first, second, third or fourth checks may take place in any order, or simultaneously, unless specifically described as otherwise. Any of first and second checks may be repeated at various intervals, and may be executed at various times during an update operation such as in S220 during update operation C.

The first check in S100 is configured to be performed during an update operation and may include, for example, a page read verification based on a master block including information regarding all of other memory blocks in a shared memory. Similarly, the second check in S200 is configured to be performed during an update operation, and may be included as an execution thread of an update daemon of the update operation. Examples of such checks may include an index structural validation and/or a row content validation.

Returning to FIG. 1, a third check may be executed in S300 at a time interval B between update operations A and C. For example, S300 may be executed between update functions of an update daemon that is applying distinct update operations in operations A and C. This processing may be beneficial, as described further below, during updates with numerous discreet functions, and may be performed, for example, outside of the main update processing. A third check may include a transaction log verification based on a portion of a transaction log of previous actions related to the database. The third check may be performed as a "re-entrant" procedure that is called only when, for example, the update daemon has no updates, such as from sendfiles, to process. Thus, a third check at S300 may be resumed during interval E at S310 after completion of, for example, the update operation C. Transaction log verification may be used to identify aspects of the database such as a semantic correctness of the transaction log, a valid database memory allocation, and/or validity of memory block addresses related to operations of the transaction log.

With further reference to FIG. 1, a fourth check may be executed in S400 at a time when the database is not being updated, e.g. interval "No Updates D." Examples of fourth checks during S400 may include a database memory accounting including identifying any multiple uses of a single memory element. A fourth check may also include a foreign key verification including at least one of identifying any child records that refer to an invalid parent address, and identifying a discrepancy in a number of child records referring to a valid parent record. According to embodiments, a fourth check may be executed in S420 prior to, or immediately prior to, loading a replica with a copy of the master database, such as through an initial sendfile.

As also shown in FIG. 1, the integrity of data in the database may be verified, according to methods such as those discussed further below, in S500 by referring to the results of any of the checks in S100-S420.

According to embodiments, combinations of the first, second, third, and fourth checks may be performed and used to validate all data structures within a distributed database, such as a DNS top level, or other authoritative, domain server, at least once every 6 hours, and/or validate all data in the database at least once every 24 hours, which may provide advantages over known methods in the timely validation and accuracy of data in extremely large high-availability databases. Further details regarding exemplary checks and validation procedures are discussed below.

As mentioned above, the components that comprise exemplary embodiments of an overall LUE scrubbing functionality may be broken into several tools that may be configured to be used independently. Each LUE check may be assigned to the tool or process based upon when the tool should be run with respect to the regular database activity. Some types of checks have limitations that make it impracticable to run while the database is actively being updated, and some checks have limitations, such as associated processing resources and costs, such that they should be done only when the database is not being used.

In general, disclosed embodiments may include checks in four "check classifications" including (1) those that can be run while active database writes are occurring, but should be done from a separate process from the update daemon; (2) those that can be run while active database writes are occurring within the update daemon, but can be done outside of the main update processing; (3) those that can be run between active database updates, but cannot be done in parallel; and (4) those that can only be run while the database is not actively being updated. Each of the four classifications is preferably handled in different ways. For example, Type 1 checks may implemented as a separate tool that can be run while database reading and writing is occurring, such as running the check in response to a trigger or manually by an operator. Type 2 checks may be implemented as a separate execution thread within the update daemon running in parallel with the update processing logic. Type 3 checks may be implemented as re-entrant checks done in-between update processing in the update daemon while the update daemon is not busy processing updates such as through sendfiles. Type 4 checks may be implemented as a separate tool that is run while the update daemon is stopped before an ISF or checkpoint is loaded.

Figure 2:
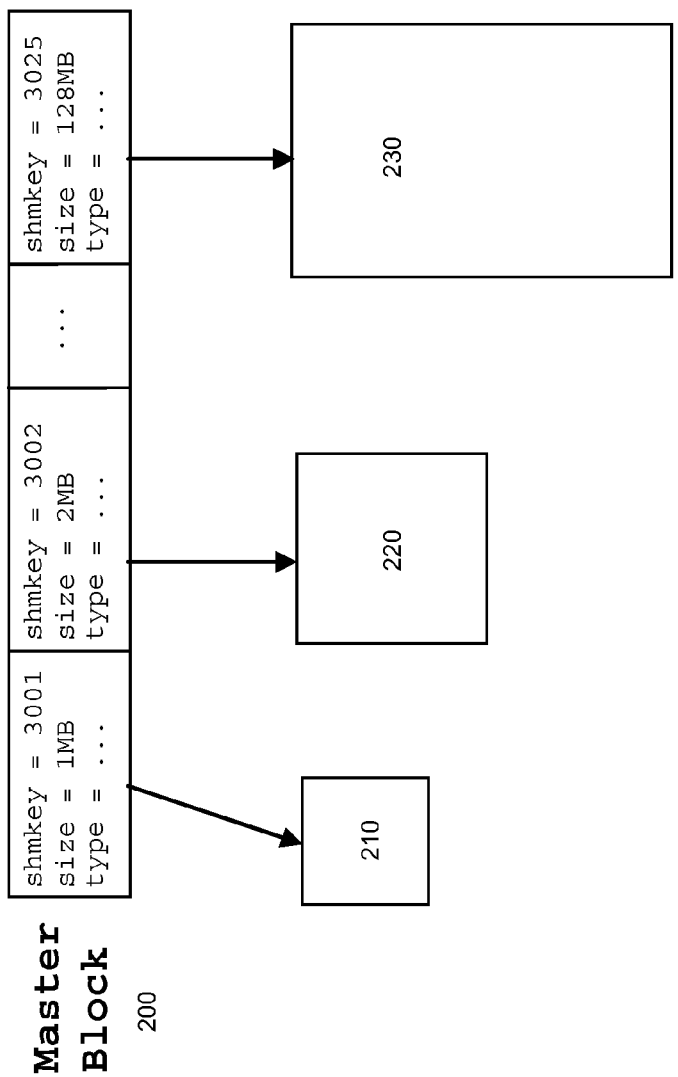
FIG. 2 depicts aspects of an exemplary master memory block in accordance with an embodiment of the present invention.

An exemplary Type 1 check may include a first tool that can be used to perform a check as needed, or at automated triggers or times. As shown in FIG. 2, a first tool may implement a Type 1 check that is performed at a designated time or in response to an automated trigger. In the embodiment depicted in FIG. 2, the tool reads a shared memory database based upon a configured shared_memory_key parameter and uses the database master block 200 to verify all allocated shared memory for the database is readable on a page-by-page basis. In general, this technique uses the structural references within a "master block" to verify that the entire database is readable and has no machine or operating system errors during the scan.

The tool depicted in FIG. 2 may be used in databases with a shared memory master block 200 that has a reference to all of the other blocks in shared memory including the shared memory key and the block size. Each block 210, 220, 230 may have its own purpose in the overall database. This is shown conceptually in FIG. 2.

Figure 3:
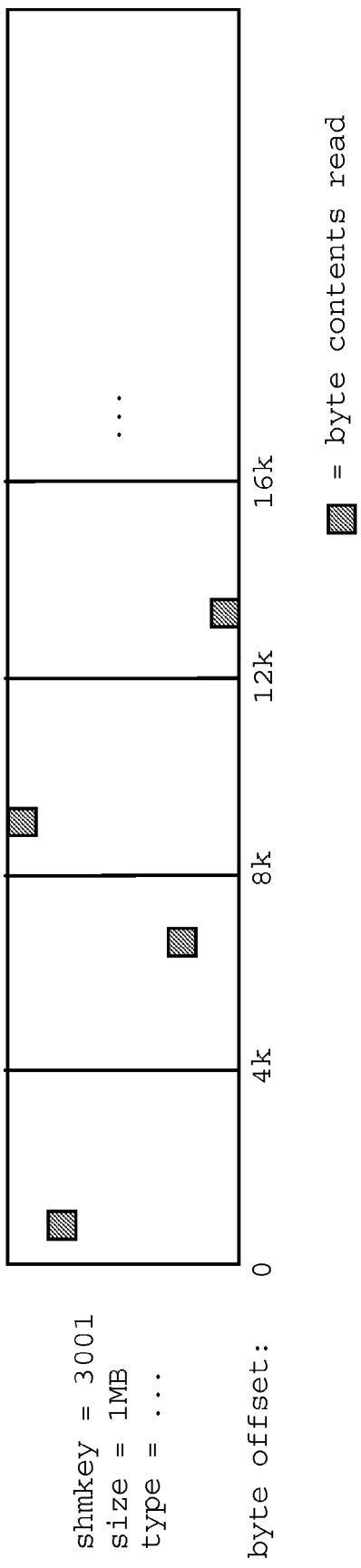
FIG. 3 depicts aspects of reading an exemplary memory block in accordance with an embodiment of the present invention.

In embodiments, bytes may be read in a shared memory block by page. For example, all system memory may be organized into 4K pages, as shown in FIG. 3. The tool may verify every page in each shared memory block, including the master block 200, and may be read without an operating system signal being raised. The tool may attach to each shared memory key and loop over the block starting at byte 0 through the block size in 4K chunks. The tool may read a single, random-offset byte within each page, as also shown in FIG. 3.

An error may be logged under the following conditions:
The master block cannot be read to determine the shared memory keys and sizes of the rest of the blocks in the database.
The shared memory fails a shmget( ) command by shared memory key.
The shared memory fails a shmat( ) command by shmid.
Reading a byte of any page in a shared memory block results in SIGBUS or SIGSEGV.

Other examples of Type 1 checks are also contemplated as within the scope of the invention including, for example, such checks as may be implemented as a separate tool that can be run while database reading and writing is occurring.

An exemplary Type 2 check may be implemented as an execution thread of an update daemon of the update operation. For example, scrubbing may be enabled in the update daemon, whereby a background thread is started that validates several of the in-memory database structures. This thread may be used to perform various Type 2 checks continuously. In embodiments, the scrubbing thread may be rate limited by CPU utilization, for example, where the background thread is deemed less critical than the main update processing. CPU rate limiting may be achieved, for example, by configuring a maximum CPU percentage for the update daemon. As the update daemon approaches this limit, a number of checks performed each second may be decreased. CPU time as a percentage of real elapsed time may be calculated using a decaying average over a short time window, for example a few seconds. The calculated percentage may be used to determine how much time the scrubbing thread will sleep, for example, between 0 milliseconds and 1,000 milliseconds. The scrubbing thread may then be configured to sleep the determined unit of time between each unit of checking (e.g. a single hash chain for index verification).

An exemplary update daemon scrubbing thread may be configured to repeatedly perform one or more of the following checks in turn:
Primary and Secondary Index Verification, Record Content Validation, and Dirty Bit Audit.
Schema Invariance Checking
Master Block Invariance Checking.

Primary and Secondary Index Verification may be used while a database is being updated and may scan every record of a table and ensure that searching for that record across all indexes is found using the index. For example, such checks may verify that every record in every primary or secondary key index is assigned to the correct hash bucket of a hash index, as described with reference to FIG. 4. In embodiments, exemplary databases may be configured such that each of primary and secondary indices is organized as a hash table 410 in a hash block 420 of the shared memory database. Individual non-empty slots in the hash table 410 reference either a record in a variable allocation block 442-446 or a hash node 450 in a variable allocation block 460. The hash node 450 may be referenced, for example, if multiple records hash to the same slot in the hash table. In the example, three records 442, 444, 446 are indexed from the same hash table, with record 444, 446 hashing to the same value. Thus, reference to a specific one of record 444 or 446 may be achieved through first referencing to hash node 450, as shown Exemplary Type 2 checks may scan a primary hash table for every application table. Each non-empty bucket may be traversed to the individual records, e.g. 442-446. Each index, including the primary key index, may then used to search for the record by using the fields of the record for each index defined for the table. The results of the search are scanned to ensure it contains the original record used to perform the search by verifying that the key record offset matches the key record offset of the original record. If the record cannot be found using a particular index, the record discrepancy may be logged as a key lookup error.

Figure 4:
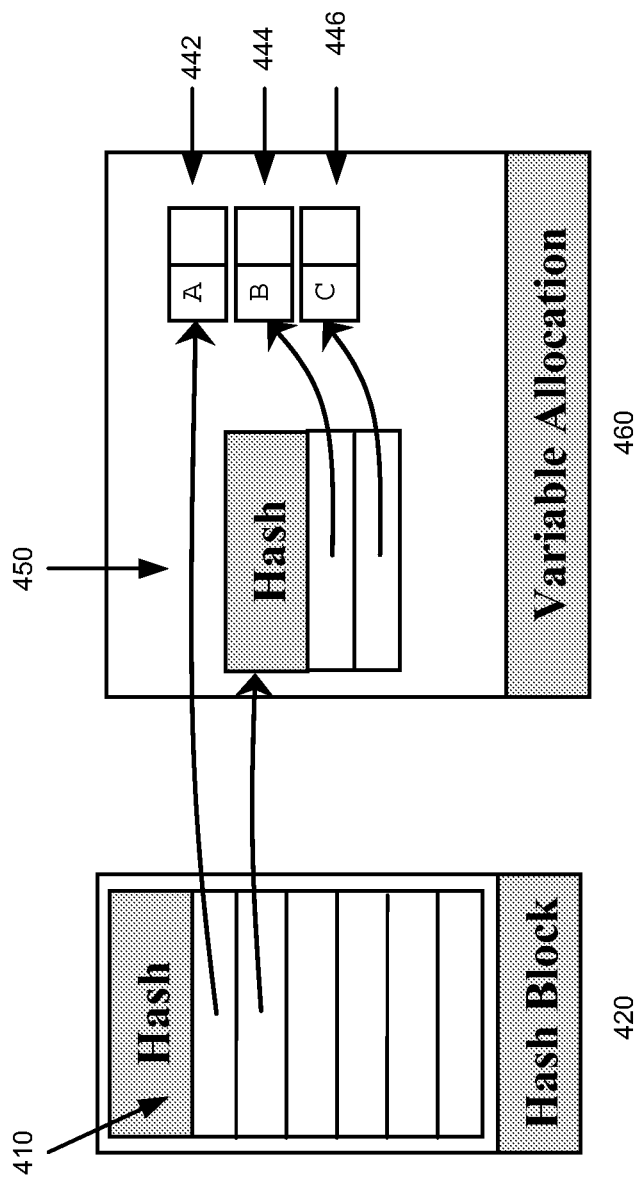
FIG. 4 depicts aspects of an exemplary hash table index structure and navigation in accordance with an embodiment of the present invention.

To illustrate the operation more fully with an example using the records in FIG. 4, consider that record 442 has been found by scanning a primary key index. The record 442 may be indexed through secondary indices as well as the primary index. The table to which the record belongs may be searched using key fields of record 442, first using the fields of the primary key, and then using the field of each secondary index. In all searches, record 442 should be found. Otherwise, a record discrepancy may be logged as a key lookup error.

Record Content Validation may also be used as part of Type 2 checks. While this checking differs from index verification, in embodiments, the scrubbing thread may be configured to execute both checks at the same time. In general, these techniques may match the byte contents of every row against the allowed values described in the schema. Errors may be flagged when the record representation is invalid according to the schema. An approach used to verify record contents may be applied in the reference to hash table structures such as shown in FIG. 4.

In embodiments, exemplary database records (also called database rows) may be configured as instantiations of a schema definition of the table to which the rows belong. Record content validation may thus compare the contents of each record to the schema definition and verify that the contents are consistent with the schema. Records may be found by scanning all primary indices to the record nodes. Additional details of an exemplary database record layout are depicted in FIG. 5.

Figure 5:
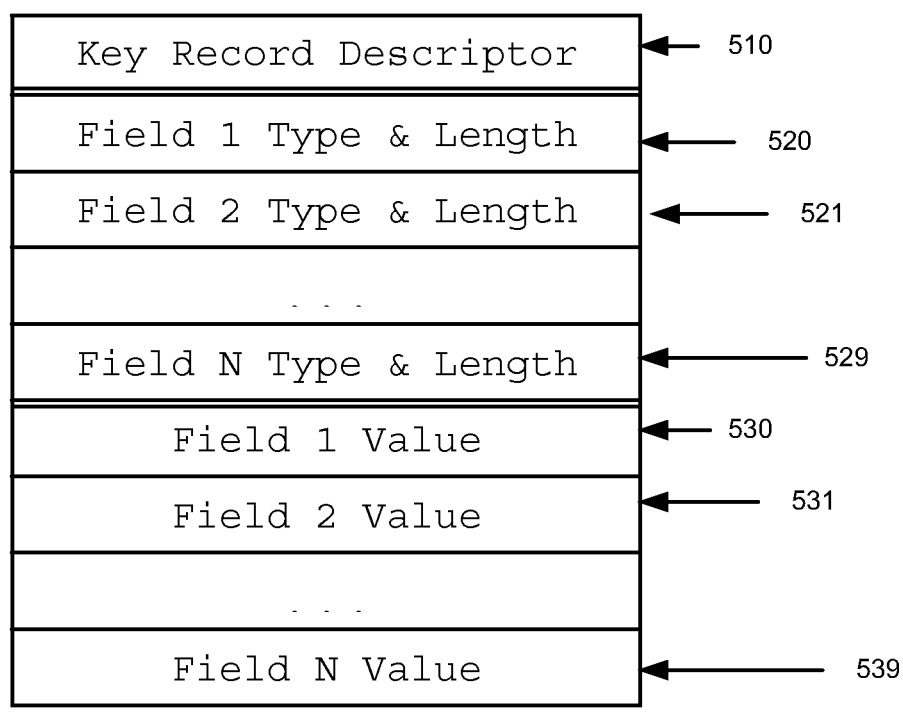
FIG. 5 depicts aspects of an exemplary database record layout structure in accordance with an embodiment of the present invention.

As shown in FIG. 5, records may be stored in variable allocation blocks with a key record descriptor 5100 followed by repeated field type and length details 520-529, and finally followed by the individual field values 530-539. The record content validation of the scrubbing thread may perform checks that the record and field relationship is consistent with the schema definition. For example, in embodiments with appropriately configured databases, the following details may be checked as part of the record content validation:
Every field within the database record has one of the following type values: VARCHAR (1), IPv4 (2), INT8 (3), INT16 (4), INT32 (5), INT64 (6), REAL32 (7), REAL64 (8), BIT (9), BASE64 (10), IPv6 (11), CHAR (12), BCD (13)
Any field within the database record of type CHAR has a size that is less-than-or-equal-to the size specified for the field within the database schema definition.
Any field within the database record of type VARCHAR has a size that is less-than-or-equal-to the size specified for the field within the database schema definition and is NULL terminated.
Any field within the database record of type CHAR or VARCHAR has a value that is consistent with the conversion type:
  A field with conversion type "ToUpper" has no lower-case characters [a-z].
  A field with conversion type "ToLower" has no upper-case characters [A-Z].
  A field with conversion type "NoEscapes" does not have any of the following sequences of bytes: \\, \r, \n, \t, \0, \+, \s.
  A field with conversion type "ToUpperAlpha" has only upper-case characters [A-Z].
Any field within the database record of type IPv4 has a size of 4 bytes.
Any field within the database record of type IPv6 has a size of 16 bytes.
Any field within the database record of type IPADDRSS has a size of 4 or 16 bytes.
Any field within the database record of type INT8 has a size of 1 byte.
Any field within the database record of type INT16 has a size of 2 bytes.
Any field within the database record of type INT32 has a size of 4 bytes.
Any field within the database record of type INT64 has a size of 8 bytes.
Any field within the database record of type REAL32 has a size of 4 bytes.
Any field within the database record of type REAL64 has a size of 8 bytes.
The total count of fields in a database row matches the "record count" specified in the schema definition of the database row.

Other checks are also possible depending on such factors as the configuration of the database, the database records, etc. Any database records that are inconsistent with the checks may be logged as a record consistency error.

Dirty bit audits may also be conducted as part of a Type 2 check. As with record content validation, such checks may be performed substantially at the same time as the index verification and the record content validation. In embodiments, each Type 2 check can be individually configured as on or off, and appropriate combination of the Type 2 checks may be driven by scanning a primary index.

For example, as records are identified by scanning the primary key hash chain, the record may be identified as "dirty", such as by recognizing a marking of the record with a dirty bit indicator, if it is part of an ongoing transaction, such as an update with one or more operations. Under normal circumstance, searches that encounter a dirty record indicating an update transaction that is underway would restart the search transaction while the update completes. The dirty bit audit may (1) record dirty records, and later (2) check that the record is no longer marked as dirty, or that the record has been removed. The scrubbing thread may maintain a list of index addresses (such as hash buckets) and record addresses that were discovered to be dirty.

As subsequent records are found using the primary index, the list may be consulted to determine if records are persistently dirty. A record may be considered to be persistently dirty based on a time measurement and/or a number of passes. For example, if a record is marked as dirty for more than 3 seconds in total, or the record has been considered dirty through at least 3 passes after one second of the record first being identified as dirty, the record may be considered persistently dirty. Any records meeting designated criteria may be logged as a persistent dirty record.

In embodiments, a sorted list may be recorded with elements including one or more of:
Table ID of the record (first sort key)
Index address, such as hash bucket of the record (second sort key)
The key offset of the record (third sort key)
The time (in seconds) the record was first identified as dirty.
The count of times the record was scanned after one second of being identified as dirty.
A dirty bit audit checking may be configured to add records to a list of records that are initially found to be dirty, and also to remove records that are subsequently found to not be dirty from the list.

Schema invariance checking may also be used as part of a Type 2 check. According to exemplary databases as described herein, a database schema is a fixed set of structures that may be compiled into the LUE components or set during initialization. In embodiments, the schema may be defined by the following two structural arrays that are statically compiled into the LUE executables:
A DatabaseTable structure that is an array of tables. See, e.g., FIGS. 6 and 7.
A RecordTable structure that is an array of fields within each table. See, e.g., FIG. 8.

Schema invariance checking may be used to ensure that the source schema is not modified over a period of time, for example throughout the life of an update daemon. In embodiments, both structures may be copied, for example at the first execution of an update daemon scrubbing thread. Subsequent iterations of the check may verify byte-wise consistency between the static structures and the initial copy. Any schema changes may be logged as a schema invariance error.

Master Block Invariance Checking may be used as part of a Type 2 check to ensure that data within a master block that is supposed to remain fixed, does so. In exemplary embodiments, a database master block, such as depicted and described with reference to FIG. 2, is a shared memory construct that defines the rest of the database layout. While some of the values within the master block may be subject to change as updates are applied to the database, several of the values within the master block are fixed. A goal of the master block invariance check is to verify that the fixed values in the master block do not get modified over a period of time, for example throughout the life of an update daemon. The fixed fields may be copied as part of a Type 2 check, for example at the first execution of the update daemon scrubbing thread. Subsequent iterations of the check may verify that each of the fixed fields has not been altered. Any changes are logged as a master block invariance error.

According to exemplary embodiments, fixed fields that are copied from the master block may include:
Log block size
Active log block count
Search block size
Checkpoint block size
Active checkpoint block count
Maximum search block count
Version number
A special byte pattern, that identifies the memory as belonging to a shared memory database implementation.

Other fields are possible as well, depending on the structure of the given database. For example, database master blocks may include other fixed fields that are appropriate to copy and compare over a period of time.

Other examples of Type 2 checks are also contemplated as within the scope of the invention including, for example, such checks as may be implemented as an execution thread of an update daemon of the update operation.

As mentioned above, Type 3 checks may be implemented as re-entrant checks done in-between update processing in the update daemon while the update daemon is not busy processing updates such as sendfiles. That is, the update daemon implements Type 3 checking as a re-entrant procedure that is called only when the update daemon has no sendfile updates to process. The procedure is considered to be re-entrant because it does not typically check the entire in-memory database in one pass. That is, Type 3 checking will be done for a discreet time interval, i.e. during a break between processing sendfiles, after which the procedure state may be saved and continued at a later time as appropriate.

Since the checking is time bound and re-entrant, the state of the checking is saved before the procedure exits. In general that means a current check type is saved as well as a state specific to each check. Exemplary Type 3 re-entrant checks include:
Transaction log checking.
OID reference checking.

In general, a re-entrance procedure performs as much checking as it can with the time allotted. When one check completes, or the saved state is past the boundary of database structures, a next check may be started at the beginning. The following examples detail re-entrant checks including a state that is saved when the procedure exits.

Transaction log checking involves checking a transaction log to confirm that the entries are consistent with the transaction state of the database. Typically, the transaction log details the individual operations that are performed for each database transaction, whether the changes are committed to the database or not. Uncommitted transactions may be rolled back during system restart so that a consistent database image is always present when the system is functioning normally. Transaction processing may involve the use of the transaction log, usually with a head (oldest logged operation) and a tail (newest logged operation). The individual operations logged depend on the database structure, but, in general, logical rules may be constructed to validate a state of the database against operations read from the log.

Figure 9:
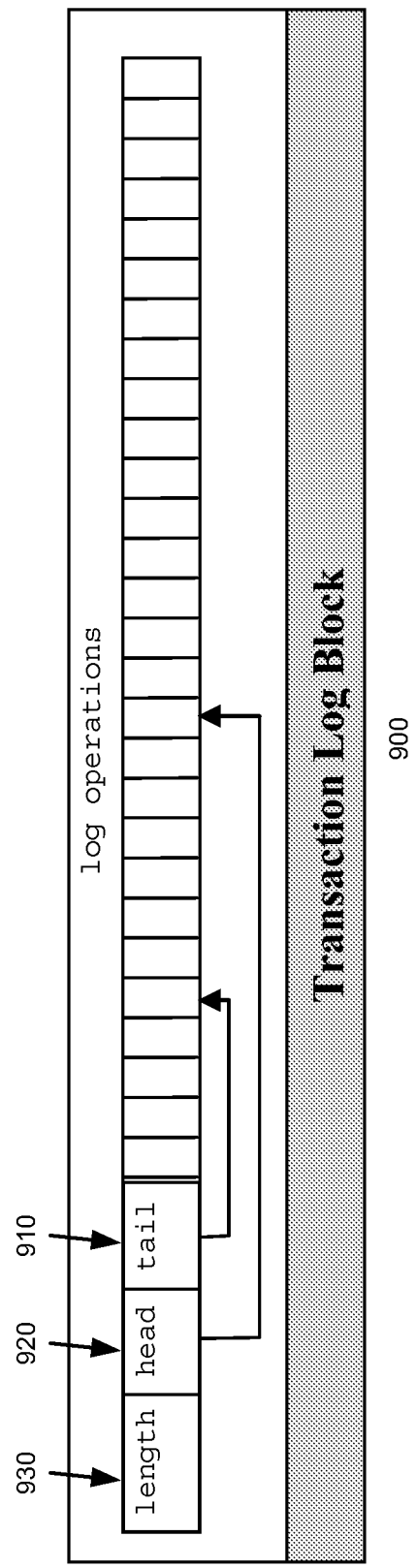
FIG. 9 depicts aspects of an exemplary transaction log structure in accordance with an embodiment of the present invention.

According to embodiments, a transaction log may be present in a single memory block allocated during database initialization. An exemplary structure, including a memory block 900, is shown in FIG. 9.

The transaction log block in memory block 900 may include a tail identifier 910 including an address of the oldest log entry, a head identifier 920 including an address of the most recent log entry, and a length identifier 930 such as a check for the tail identifier 910 and the head identifier 920. Transaction log checking may scan the transaction log by looking at all operations that are in the log, such as between the tail 910 (the oldest log entry) and the head 920 (the most recent log entry). The log entries may be placed in the transaction log in a circular fashion so the head could be before the tail indicating wrap-around.

As transactions are performed, log operations are added as the head of the log. As transactions are committed (i.e. confirmed as completed), the tail may be rolled-up to the transaction boundaries, although this may only occur at periodic time intervals. Thus, log operations may be present between the tail 910 and head 920 for one or more transactions during this time interval.

Transaction log checking may verify the log operations are syntactically valid and make sense in the context of the database state. For example, according to the structure of the database, particular log operations may be checked for properties including:
Has an operation value of NOOP (0), ALLOC (1), FREE (2), EXCHANGE (3), SF_START (4), SF_DONE (5), TIMESTAMP (6), OID_ADD (7), OID_REMOVE (8), SET_BIT (9), REF_COUNT (10), DIRTY (11), SAVE_WORD (12), COMMIT (13), or CHECKPOINT (14).
Any transaction log entry of type ALLOC has a first parameter that refers to an allocated memory block with a size that matches the second parameter.
Any transaction log entry of type FREE has a first parameter that refers to an allocated memory block.
Any transaction log entry of type EXCHANGE has a first parameter that refers to an allocated memory block.
Any transaction log entry of SF_DONE has a second parameter that is less-than-or-equal-to the highest applied sendfile ID in the master block.
Any transaction log entry of OID_ADD has a second parameter that refers to an allocated OID table entry.
Any transaction log entry of OID_REMOVE has a first parameter that the upper 16-bits refer to an allocated OID table entry.
Any transaction log entry of SET_BIT has a first parameter that refers to an allocated memory block.
Any transaction log entry of REF_COUNT has a first parameter that refers to an allocated memory block.
Any transaction log entry of DIRTY has a first parameter that refers to an allocated memory block.

The above rules are merely examples of confirmatory checks that may be used to justify whether the state of the database corresponds to transactions in the transaction log. Other checks are possible, depending on the configuration of the database and its operational rules. If it is determined that a log operation does not meet the justification parameters, the properties may be logged as a log operation error.

In order to implement transaction log checking to be re-entrant, a current log entry slot that has been analyzed may be saved as well as the current tail and head values. A counter of the number of log entries validated may also saved. Upon re-entry to this check, checking may resume at the saved position or a new tail value, such as if the tail has been rolled up past the saved position. The log check may be considered complete when the counter equals the total log size 930, assuming the tail has not been rolled up, or if the current position equals the head 920.

Figure 10:
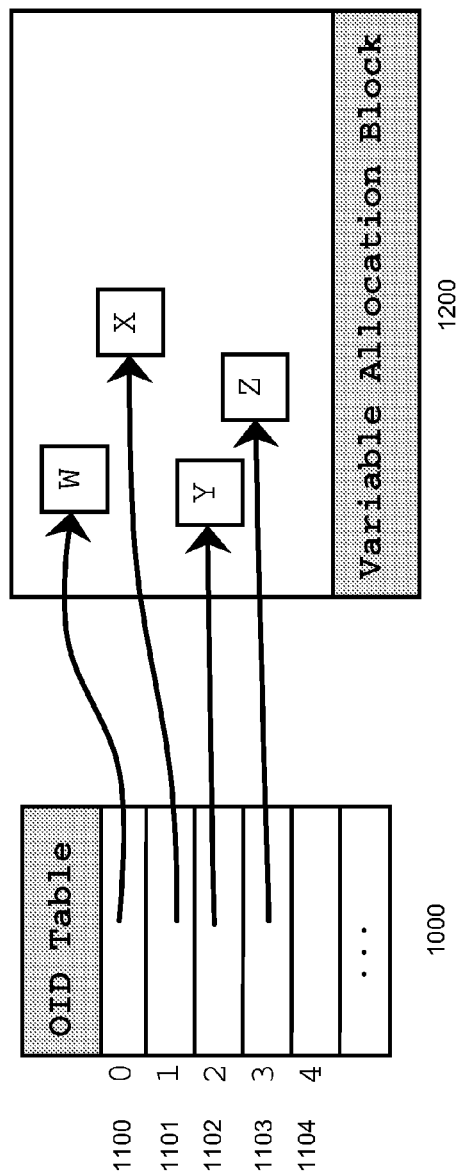
FIG. 10 depicts aspects of an exemplary object identifier table and associated navigation in accordance with an embodiment of the present invention.
Figure 11:
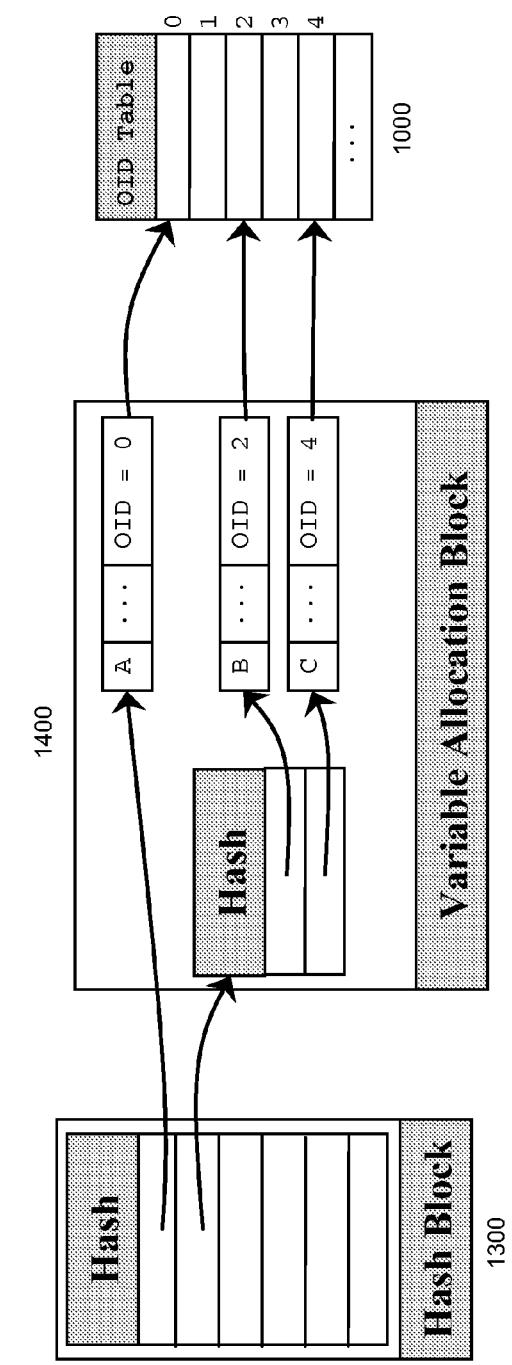
FIG. 11 depicts aspects of an exemplary hash table, object identifier table and associated navigation in accordance with an embodiment of the present invention.

Type 3 checks may also include foreign key verification, such as an object identifier (OID) table reference check, exemplary aspects of which are described with reference to FIGS. 10 and 11. In general, these techniques may verify that database records that refer to other database records actually reference existing records. Exemplary techniques may scan every record in the database. As foreign-key relationships are identified, a "parent record" is searched using information available in the "child record." An error is flagged each time a child record refers to a non-existent parent record.

Data models exhibiting a foreign key relationship may have table rows that reference other database rows, whether in the same table or another database table. Such relationships may be implemented in certain databases by using an OID to the record that is being referenced. The OID values may refer to an OID Table slot position. OID table reference checking may be used to verify both that the records that refer to an OID (e.g. contain a foreign key) and the records that are referenced match.

The records that are referenced by an OID are referred to as "parent records". For example, as shown in FIG. 10, an OID Table 1000 may include a plurality of foreign key references 1101-1104 that refer to a corresponding plurality of parent records W-Z in variable allocation block 1200.

Records that contain an OID reference may be referred to as "child records". For example, as shown in FIG. 11, records A-C in variable allocation block 1400 may themselves include references to the corresponding slots in OID table 1000 that refer to the records.

Before OID table reference checking is done, all table ID's with a foreign-key relationship may be kept in an array. The array may serve as the list of child tables to be scanned. An OID table reference check may be configured to loop over each child table and then scan the primary key hash table, such as in hash block 1300, associated with the table. Each record in a hash chain which has an OID reference may be checked by following the OID reference from variable allocation block 1400 to the parent record in OID table 1000. The child record OID reference value and the parent record's OID value should be identical. Any differences may be logged as an OID mismatch error.

To implement OID table reference checking to be re-entrant, a current table ID and index offset such as a hash table bucket may be kept as the starting point for subsequent checking. In embodiments, each check may be done on a hash bucket boundary so all child records in the same hash bucket are checked completely.

Other examples of Type 3 checks are also contemplated as within the scope of the invention including, for example, such checks as may be implemented as re-entrant operations interspersed among update operations.

Turning to Type 4 checks, as indicated previously, these checks may be configured to run automatically, or on demand, at times when the database is not otherwise engaged in update operations. For example, an exemplary tool may include one or more Type 4 checks that are run when the update daemon is not running. Such checks may be particularly beneficial and/or efficient to implement, for example, when run after updates have been applied to the database through sendfiles, but before a new ISF or checkpoint is loaded. Such timing may ensure a quiet database with a comparatively large amount of database structural entropy.

Exemplary Type 4 checks may include, for example, one or more of:
1. Validating foreign-key relationships by checking whether reference counts on a parent record match the number of child records that refer to the parent's OID.
2. Validating shared memory consistency by validating every byte in the database has a single purpose, and that none of the memory is left unused.

Figure 12:
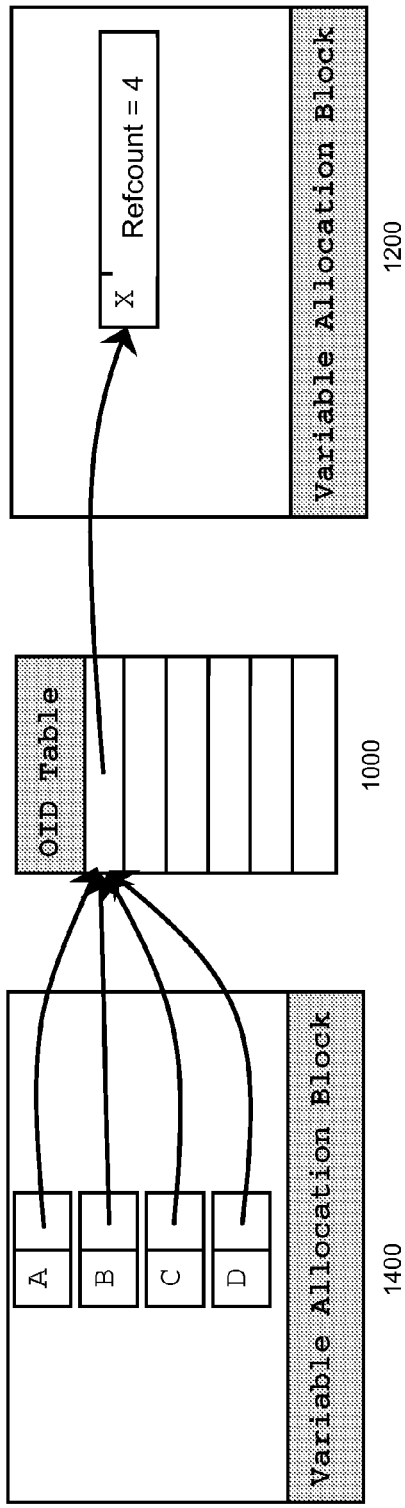
FIG. 12 depicts aspects of an exemplary object identifier table and associated navigation in accordance with another embodiment of the present invention.

With respect to Type 4 Foreign Key Relationship Checking, as previously discussed with reference to FIGS. 10 and 11, data models exhibiting a foreign key relationship have table rows that reference other database rows, whether in the same table or another database table. To maintain referential integrity, each record that has an OID may keep a reference count of the records that refer to it, such as shown in FIG. 12. For example, record X is shown as having a Refcount=4. This may be used to prevent an improper deletion, since a record with a reference count greater than zero should not be deleted, otherwise the referring records would point to a non-existent reference. To verify reference counts, a tool may scan the parent records, and represent that record by a unique address, and maintain it in a map of addresses to reference counts. A reference count may be initially set to that of the parent record. Subsequently, child records may be scanned. As references to a parent are found, the address map counter may be decremented. Errors may be flagged each time a parent record is decremented below 0, or after scanning all child records and any non-zero counters remain.

In the example depicted in FIG. 12, records A, B, C, and D in variable allocation block 1400 all refer to record X in variable allocation block 1200. It should be understood that each of these records (A, B, C, D, and X) may be in the same table or among different tables. Since four records A, B, C, D have a foreign key reference to X, record X has a reference count of four.

A scrubbing validation check with foreign key relationship checking may verify that the reference count of all OID records matches the count of records that actually refer to it. This may be implemented by looping over all records in the shared-memory database that have foreign keys to another record. The validation check processing may increment a counter for each reference to an OID in a table that is the same size as the OID table. Such processing may verify that each unique OID slot has the same count of references as the reference count in the record that the OID points to. In other words, it may be used to keep a parallel table, e.g. an array, to the OID table, in which the parallel table has an actual count of child records. All counts are initialized to zero, and as child records refer to a parent, the parallel counter table is incremented in the same slot. At the end of scanning all records, the count should match the reference count of each record referenced in the OID table. Any differences may be logged as a reference count mismatch error.

Validating shared memory consistency may also be performed as part of a Type 4 check by confirming that every byte in the database has a single purpose, and that none of the memory is left unused. According to exemplary embodiments, a shared memory database may be organized into shared memory blocks. A goal of this check is to perform a deep verification that every byte in the shared memory database is assigned a single structural purpose and that every byte in the system is accounted for. This may be accomplished by mapping every byte in the shared memory database to a bit in a bitmap. As the structures are scanned, every bit should be set exactly once. Additionally, database structures are often categorized in terms of records, parts of indexes, locks, transaction log entries, free/unused memory and, perhaps, others. Records may be accounted for by scanning each table once using the primary index and accounting for the memory consumed by the row. According to embodiments, indexes may also be scanned and each node in the index accounted for.

Figure 13:
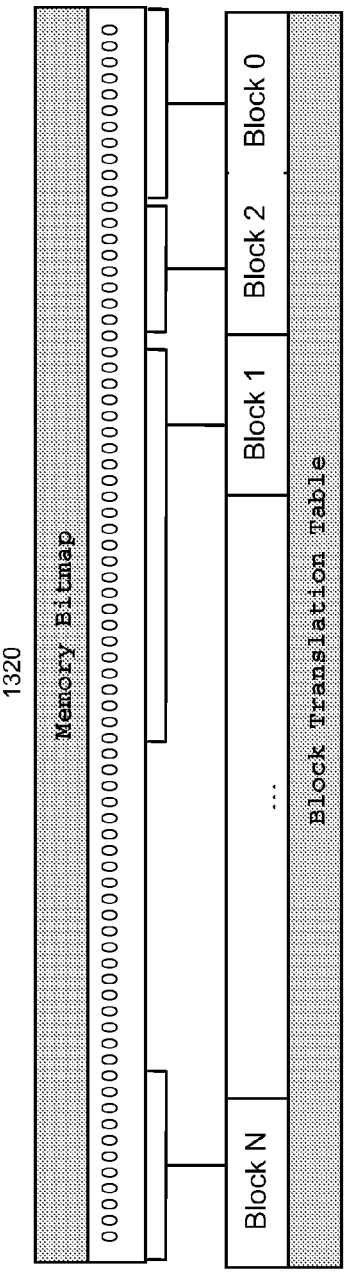
FIG. 13 depicts aspects of an exemplary memory usage bitmap and block translation table in accordance with an embodiment of the present invention.

An exemplary check is described with reference to FIG. 13, and may begin with an initialization procedure including determining the total amount of shared memory that has been allocated by using master block master records. These records may be configured to indicate the shared memory key and the block size. This information may be used to create a bitmap 1320 that has the same number of bits as the total amount of shared memory allocated to the database in bytes, words, or other minimum granularity. The master records may be used to build a translation table 1340 from each block number to the lowest represented bit in the bitmap. All the entries in the bitmap may be initialized to zero.

Once the shared memory database map is initialized, the structures within the shared memory database are "walked", that is all references to key records and/or hash chains will be verified. Depending on the block type, the memory may be allocated simply to the memory map using the block header or the structure may be more deeply scanned allocating subparts of the structure to the memory map. As each bit is set, the bit offset may be first checked to be certain that it hasn't previously been set. This condition would indicate that a byte was used more than once.

According to database configuration, checks performed by each block type may be as follows:

Master Block: The master block is allocated to the memory map simply by marking both the block header and the block payload as allocated.

Checkpoint Block: Each checkpoint block is allocated to the memory map simply by marking both the block header and the block payload as allocated.

Transaction Log: The transaction log is allocated to the memory map by:
1. Marking the fixed-size block header as allocated.
2. Marking the transaction log header as allocated.
3. Marking the log itself as allocated by multiplying the "table length" from the log header times the size of each transaction log entry.

Hash table: Each hash table block is allocated to the memory map by:
1. Marking the fixed-size block header as allocated.
2. Marking the fixed-size "table length", "record type", and "initialized" slots as allocated.
3. Marking the "offsets" as allocated by multiplying the "table length" value by the size of each table slot.

OID table: The OID table is allocated to the memory map by:
1. Marking the fixed-size block header as allocated.
2. Marking the fixed-size OID header as allocated.
3. Marking the OID table as allocated by multiplying the "table length" value from the header times the size of an OID.

Variable allocation: As with other block types, the initial allocation to the memory map will include:
1. Marking the fixed-size block header as allocated.
2. Marking the fixed-size variable allocation header as allocated.

Once the block headers are accounted for, the free memory within the variable allocation block may be accounted by following the variable allocation "available" bins, also sometimes called a free list. A depth-first-search may be employed, for example, to follow the entire linked memory list of all memory bins marking each memory block as allocated to the bitmap. At this point the only remaining memory within the variable allocation block that is not accounted for should be the memory allocated to index structures and records. These items may be accounted for separately by traversing the indices.

Index Traversal: After all blocks are initially allocated to the bitmap, the index nodes and records may be assigned by traversing the index such has "walking" an entire hash index. A hash index is traversed by scanning the has table and following all hash nodes to the records that are indexed by the hash table, as described above with reference to FIG. 4. The hash nodes and records may be allocated to the bitmap as follows.

Each hash node may be allocated to the bitmap by marking, for example, a hash node header as allocated plus marking each offset (to a record) within the hash node as allocated. The offset of the hash node is used to mark the bitmap.

Each record may be allocated to the bitmap by following the primary index. A hash based primary key index would be traversed by following each offset within hash nodes to the record itself. The entire record may be allocated to the bitmap by marking the record header, the type and length values times the number of records, and finally each field based upon the size indicated within the record. The offset of the record may be used to mark the bitmap.

After allocating each byte to the memory map, the entire memory map, every byte should be accounted for in the bitmap with a value of '1'.

By implementation of combinations of the above checks, and similar checks, extremely large highly-accessible databases may be thoroughly verified, with a high degree of accuracy, in a relatively short period of time. For example, when applied to a DNS top level domain server, which may contain data on the order of 10-20 gigabytes of shared memory, the use of described first, second, third, and fourth checks may validate all data structures within the distributed database at least once every 6 hours, and/or validate all data in the database at least once every 24 hours. Thus, not only can particular errors be identified in a timely manner, thus reducing the amount of potentially erroneous data distributed to users, the rapid identification of such errors can be used to quickly determine causal factors, such as faulty software, and correct the underlying problem before a significant corruption of data occurs.

Figure 14:
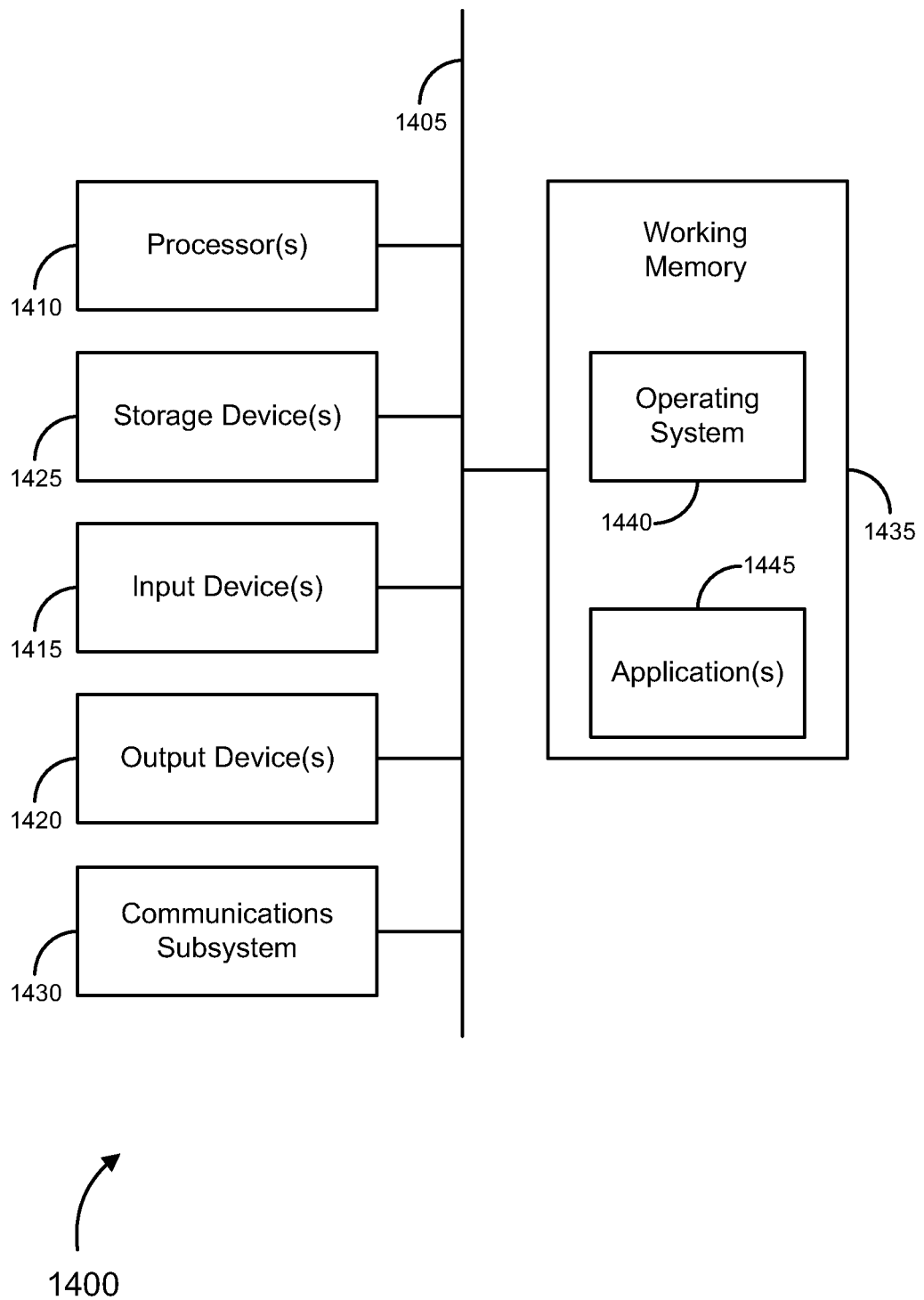
FIG. 14 depicts aspects of an exemplary computer system in accordance with an embodiment of the present invention.
Figure 15:
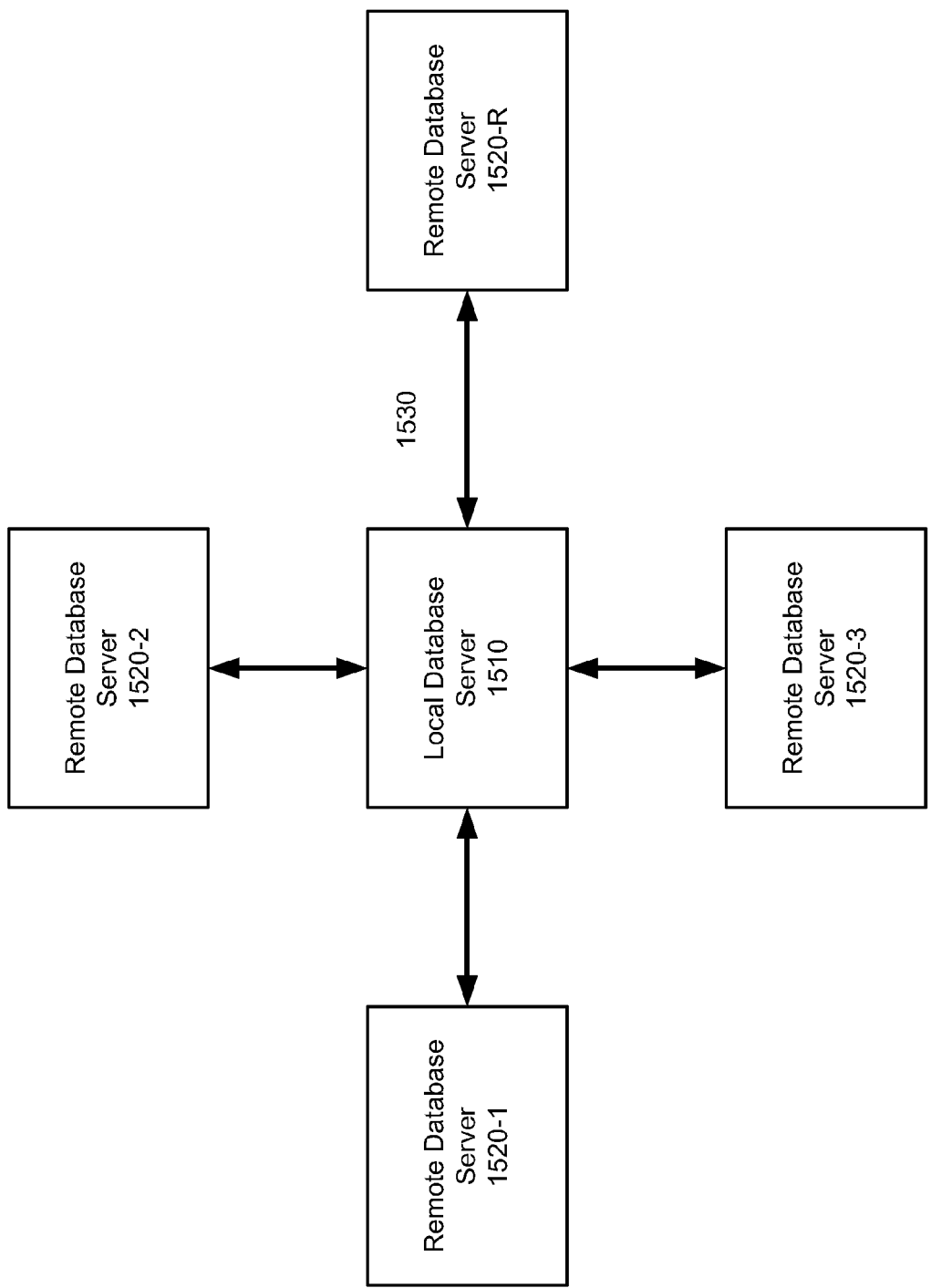
FIG. 15 depicts aspects of an exemplary distributed database system in accordance with an embodiment of the present invention.

To perform the actions of the described database systems and methods, a computer system 1400 or similar device as generally depicted in FIG. 14, in addition to, or along with, a distributed database structure as generally shown in FIG. 15, may be used. FIG. 14 provides a schematic illustration of one embodiment of a computer system 1400 that can perform the methods provided by various other embodiments, as described herein, and/or can function as the database server, such as local database 1510 and/or remote database 1520 shown in FIG. 15. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner.

FIG. 15 is a block diagram of a distributed database with a hub and spoke architecture in which aspects of the present invention may be implemented. Generally, the system may include a local database 1510 and one or more remote databases 1520 connected to local database 1510 via any connection mechanism, e.g., Internet, WAN, LAN, etc. The databases may send and receive update data such as shown in links 1530. As mentioned previously, update operations in a distributed database, such as communications 1530, may include different forms of updates such as, for example, sendfiles dealing with changes to a database over a discreet period of time, and/or an initialization update that may include a snapshot, or complete copy, of the database, Further details of exemplary updates are described with reference to FIG. 16.

Figure 16:
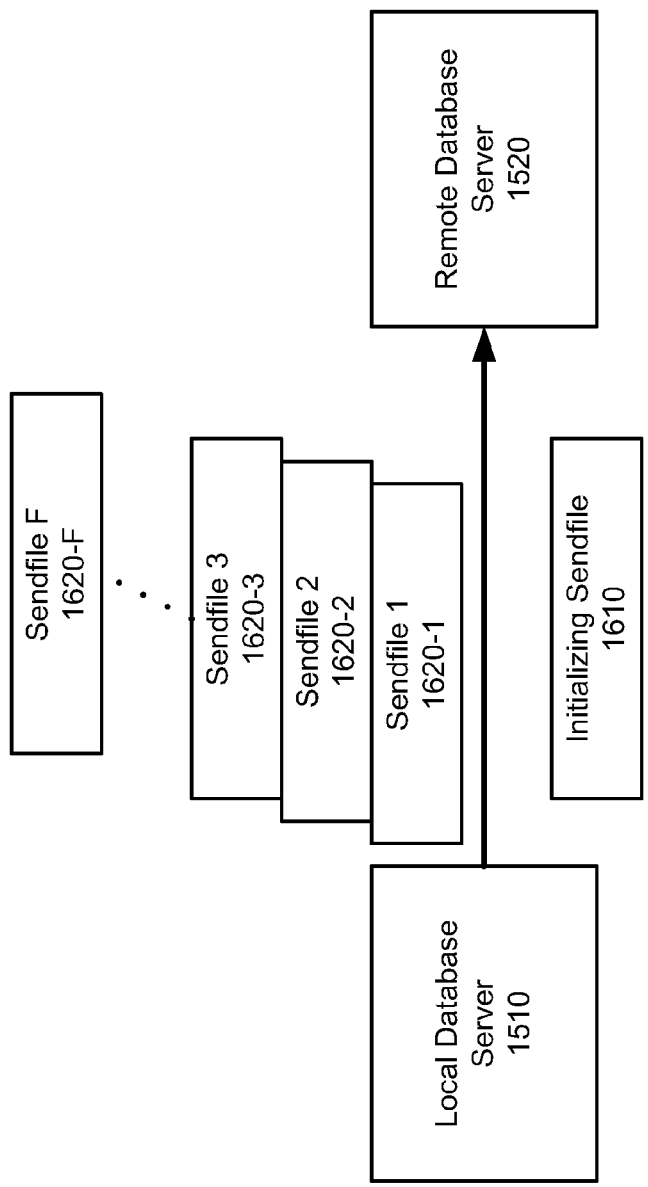
FIG. 16 depicts aspects of exemplary update operations in a distributed database system in accordance with an embodiment of the present invention.

As shown in FIG. 16, local database 1510 sends F sendfiles 1620-1 ... 1620-F and initializing sendfile 1610 to remote database 1520 in order to update remote database 1520. The update files may be sent individually or in batches, such as multiple sendfiles 1620, one sendfile 1620 and one initializing sendfile 1610, multiple sendfiles 1620 and one initializing sendfile 1610, sendfile 1620 alone, or initializing sendfile 1610 alone.

In general, a processor in a remote database 1520, such as processor 1410, may receive sendfile 1620 and/or initializing sendfile 1610 including updating data from local database 1510. System 1400 may receive sendfile 1620 and initializing sendfile 1610 at remote database 1520 via communication subsystem 1430. Processor 1410 may then compare updating data in sendfile 1620 or initializing sendfile 1610 against corresponding data in remote database 1520, and/or may use various rules to determine whether to apply all or part of a sendfile 1620 or initializing sendfile 1610. If the data is different in remote database 1520, and/or if the rules indicate the all or part of the sendfiles be applied, then processor 1410 may apply sendfile 1620 or initializing sendfile 1610 to a database stored, for example, in storage device(s) 1425. Accordingly, remote database 1520 may subsequently have updated data that matches the updating data in local database 1510.

In general, the computer system 1400 is shown comprising hardware elements that can be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which can include without limitation a mouse, a keyboard and/or the like; and one or more output devices 1420, which can include without limitation a display device, a printer and/or the like.

The computer system 1400 may further include (and/or be in communication with) one or more storage devices 1425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communications subsystem 1430, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1430 may permit data to be exchanged with a network (such as the network described below, to name one example), other computer systems, and/or any other devices described herein. In many embodiments, the computer system 1400 will further comprise a working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computer system, such as the system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system to perform methods in accordance with various embodiments of the invention. According to a set of embodiments, some or all of the procedures of such methods are performed by the computer system 1400 in response to processor 1410 executing one or more sequences of one or more instructions (which might be incorporated into the operating system 1440 and/or other code, such as an application program 1445) contained in working memory. Such instructions may be read into a working memory 1435 from another computer-readable medium, such as one or more non-transitory storage device(s) 1425. Merely by way of example, execution of the sequences of instructions contained in working memory 1435 may cause the processor(s) 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory, such as working memory. Transmission media include, without limitation, coaxial cables, copper wire and fiber optics, including the wires that comprise a local bus, as well as the various components of various communication subsystems known to those of skill in the art. Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to processor(s) for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals and/or the like, are all examples of carrier waves on which instructions can be encoded, in accordance with various embodiments of the invention.

As an additional example, according to aspects of the invention, a non-transitory computer readable storage medium may include instructions that, when executed by a computer, cause the computer to perform steps as discussed herein, such as, executing one or more checks including a first check during an update operation of the database; a second check during the update operation of the database, the second check implemented as an execution thread of an update daemon of the update operation; a third check at a time interval between update functions of the update daemon; and/or a fourth check during a time that the database is not being updated. Embodiments may include further instructions with code for verifying integrity of data in the database by a computer processor based on the first, second, third, and/or fourth checks. Further instructions may be provided, as appropriate, to carry out other aspects of the invention as described herein.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

It is to be understood that the foregoing illustrative embodiments have been provided merely for the purpose of explanation and are in no way to be construed as limiting of the invention. Words which have been used herein are words of description and illustration, rather than words of limitation. Additionally, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

What is claimed is:

1. A computer-implemented method for verifying data in a database corresponding to a Domain Name Server (DNS) top-level domain server, comprising:
    performing, during execution of at least one update operation of a plurality of update operations executed by an update daemon, a first data verification that is implemented as an execution thread of the update daemon, wherein the first data verification includes at least one of an index structural validation and a row content validation;
    performing, at a time interval between two sequential update operations of the plurality of update operations, a second data verification that includes a transaction log verification of at least a portion of a transaction log of previous database actions;
    performing, during a time that the database is not being updated, a third data verification that includes at least one of a foreign-key relationship checking and a shared memory consistency checking; and
    verifying integrity of data of the database based on the first, second, and third data verifications.

2. The computer-implemented method of claim 1, further including:
    executing the first data verification in parallel with the at least one update operation of the plurality of update operations.

3. The computer implemented method of claim 1, wherein the performing the first data verification includes:
scanning a primary hash table corresponding to each application table.

4. The computer-implemented method of claim 1, wherein the performing the second data verification includes:
storing, in a memory, a current check type and a current check type state.

5. The computer-implemented method of claim 4, wherein the second data verification is a re-entrant data verification, the method further including:
retrieving, from the memory, the current check type and the current check type state; and
performing the second data verification based on the current check type and the current check type state.

6. The computer-implemented method of claim 1, wherein the performing the third data verification further includes:
performing, during the time that the database is not being updated, a database memory accounting that includes identifying any multiple uses of a single memory element.

7. The computer-implemented method of claim 1, wherein the performing the third data verification includes:
performing, during the time that the database is not being updated, the foreign-key relationship checking including at least one of identifying any child records that refer to an invalid parent address and identifying a discrepancy in a number of child records referring to a valid parent record.

8. The computer-implemented method of claim 1, wherein the performing the third data verification includes:
performing the third data verification prior to initiating an Initial SendFile (ISF) to the database.

9. The computer-implemented method of claim 1, wherein the performing the third data verification includes:
performing the third data verification after the plurality of updates have been applied to the database and before loading of at least one of a new Initial SendFile (ISF) or a checkpoint.

10. The computer-implemented method of claim 1, further including:
storing, in at least one log file, errors identified based on the first, second, and third data verifications.

11. A system for verifying data in a database corresponding to a Domain Name Server (DNS) top-level domain server, comprising:
at least one server configured to store at least a portion of the database;
at least one memory configured to store data and instructions; and
at least one processor configured to access the at least one memory and, when executing the instructions, to:
perform, during execution of at least one update operation of a plurality of update operations executed by an update daemon, a first data verification that is implemented as an execution thread of the update daemon, wherein the first data verification includes at least one of an index structural validation and a row content validation;
perform, at a time interval between two sequential update operations of plurality of update operations, a second data verification that includes a transaction log verification of at least a portion of a transaction log of previous database actions;
perform, during a time that the database is not being updated, a third data verification that includes at least one of a foreign-key relationship checking and a shared memory consistency checking; and
verify integrity of data of the database based on the first, second, and third data verifications.

12. The system of claim 11, wherein when the at least one processor is configured to execute the instructions to perform the first data verification, the at least one processor is further configured to:
perform the first data verification in parallel with the at least one update operation of the plurality of update operations.

13. The system of claim 11, wherein when the at least one processor is configured to execute the instructions to perform the first data verification, the at least one processor is further configured to:
scan a primary hash table corresponding to each application table.

14. The system of claim 11, wherein when the at least one processor is configured to execute the instructions to perform the second data verification, the at least one processor is further configured to:
store, in the at least one memory, a current check type and a current check type state.

15. The system of claim 14, wherein the second data verification is a re-entrant data verification, and when the at least one processor is configured to execute the instructions to perform the second data verification, the at least one processor is further configured to:
retrieve, from the at least one memory, the current check type and the current check type state; and
perform the second data verification using the current heck type and the current check type state.

16. The system of claim 11, wherein when the at least one processor is configured to execute the instructions to perform the third data verification, the at least one processor is further configured to:
perform, during the time that the database is not being updated, a database memory accounting including identifying any multiple uses of a single memory element.

17. The system of claim 11, wherein when the at least one processor is configured to execute the instructions to perform the method including the third data verification, the at least one processor is further configured to:
perform, during the time that the database is not being updated, foreign-key relationship checking including at least one of identifying child records that refer to an invalid parent address and identifying a discrepancy in a number of child records referring to a valid parent record.

18. The system of claim 11, wherein when the at least one processor is configured to execute the instructions to perform the method including the third data verification, the at least one processor is further configured to:
perform the third data verification prior to initiating an Initial SendFile (ISF) to the database.

19. The system of claim 11, wherein when the at least one processor is configured to execute the instructions to perform the method including the third data verification, the at least one processor is further configured to:
perform the third data verification after the plurality of updates have been applied to the database and before loading of at least one of a new Initial SendFile (ISF) or a checkpoint.

20. The system of claim 11, wherein the at least one processor is further configured to:
store, in at least one log file, errors identified during the first, second, and third data verifications.

* * * * *